Nov. 21, 1967  J. MYLO  3,353,431
STAPLE FIBER CUTTER

Filed Feb. 23, 1965  2 Sheets-Sheet 1

INVENTOR.
JOHN MYLO
BY
ATTORNEY

Nov. 21, 1967   J. MYLO   3,353,431
STAPLE FIBER CUTTER

Filed Feb. 23, 1965   2 Sheets-Sheet 2

INVENTOR.
JOHN MYLO
BY
ATTORNEY

United States Patent Office 3,353,431
Patented Nov. 21, 1967

3,353,431
STABLE FIBER CUTTER
John Mylo, Athens, Ala., assignor to Monsanto Company, St. Louis, Mo., a corporation of Delaware
Filed Feb. 23, 1965, Ser. No. 434,458
6 Claims. (Cl. 83—116)

This invention relates to apparatus for cutting continuous filamentary material into discontinuous lengths. More particularly, this invention relates to a shear-type cutting apparatus for the production of staple fiber.

In the production of staple fiber, the equipment generally used is a Beria-type cutting apparatus which comprises feeding a continuous material to a rotating circular member having a radial chamber therein for directing the material under the influence of centrifugal force beyond the periphery until cut by a cutting blade which cooperates with the peripheral surface of the rotating member. Because of the impact and shearing forces developed while severing a bundle of fibers during high-speed production, the blade becomes dull and heats up to the extent that fused ends are sometimes produced. Furthermore, long fibers are detected occasionally because of either dullness of the cutting blade or improper coaction of the blade and the rotating member. Thus, it is highly desirable to produce staple fiber utilizing severing means which obviates the above objectionable conditions.

According to the present invention, the continuous filamentary material is severed by a plurality of blades secured around the circumference of a roller to cooperate with an anvil carried by an opposed roller having the same diameter, the co-action between the blades and anvils being a scissors-type cut which is facilitated by the cutting edge of the blade slightly inclined and spring biased askew to the axis of the anvil so that rotation of the rollers at the same speed produces a point contact or cutting point between the blade and anvil at one end whereby further rotation of the rollers presses the spring biased blade into parallel contiguous alignment with the rigidly mounted anvil thereby shifting the cutting point axially in the direction of decline to produce a shear-type cut across the width of a continuous tow being fed through the nip of the opposed rollers. The several cutting blades utilized by the present invention divide the number of cuts required for each blade, depending upon the number used, thusly reducing the tendency of the blades to heat up and cause fused fiber ends. Another important accomplishment achieved by the arrangement of the cutting members is the self-sharpening imparted to the blade which facilitates the severance of the continuous filaments into uniform lengths of staple fibers, the lengths being determined by the number of blades used and the spacing thereof.

A preferred embodiment of the present invention contemplated is comprised of a pair of cylindrical members mounted on parallel shafts which are interconnected through drive gears and driven at the same speed. The outer surfaces of the cylindrical members are provided with a plurality of grooves which accommodate blades on one member and cooperating anvils on the other. The blades are spaced approximately one inch apart around the entire lateral surface of the cylindrical member and secured in the grooves by flanges mounted on each end thereof. The anvils are similarly mounted on the opposing cylindrical member.

In order to obtain a scissors-type cutting action one end of each blade is fixed and secured within its respective groove or slot and the other end is retained on a skew when said blade and anvil are not in contact with each other. The skew arrangement is made possible by cutting the slots wider at one end and biasing the blade against one wall thereof. Rotation of the cutting members brings the fixed ends of the blades into contact initially with the rigidly mounted anvils and further rotation causes engagement of the cutting members against the force of the springs. To prevent scrubbing between the members upon disengagement thereof the blades are hollow ground to provide the necessary clearance required.

The blade carrying cylindrical member is covered with a resilient sleeve or cot between the blades which is yieldable to provide a firm grip on the material being fed between the opposed rollers, the thickness of the cot being determined by the nip pressure necessary to hold the feed material in a firm grip. Thus, the continuous material is advanced between the rollers and held firmly in place without imparting any undesirable affects to the filaments while they are severed into staple fibers having uniform lengths.

It will be apparent to those skilled in the art that the rollers should have a circumference great enough to be capable of carrying several blades which will increase the time interval between engagement thereby preventing the blades from heating to an elevated temperature above a desired level. Rollers having diameters ranging from 4 to 12 inches have been found to perform properly. While rollers having diameters outside of this range may be used, it has been discovered that rollers having diameters within the stated range are economically practical and provide proper clearance for disengagement of the cutting members when operated at high speeds without damaging any parts of the appaartus. In fact, the intermeshing of the cutting members tends to sharpen the blades.

The amount of skew imposed on the blades by the widened slots at one end and the force of the crescent springs is predetermined by the length of the cutting members, which length is of course determined by the width of the material to be severed. For example, a blade 8 inches long positioned on a roller 5 inches in diameter preferably has a cutting surface inclined at approximately 1 degree and the axis thereof is skewed approximately 1/32 inch with respect to the parallel axes of the opposed rollers that carry the cutting members. It is to be understood, however, that the inclined angle may range from a fraction of a degree to slightly greater than 1 degree and the blade may be skewed from .010 to 0.10 inch for a blade 8 inches length.

Other feautres and advantages of the invention will be apparent from the following detailed description when read in conjunction with the drawing in which.

Figure 3:
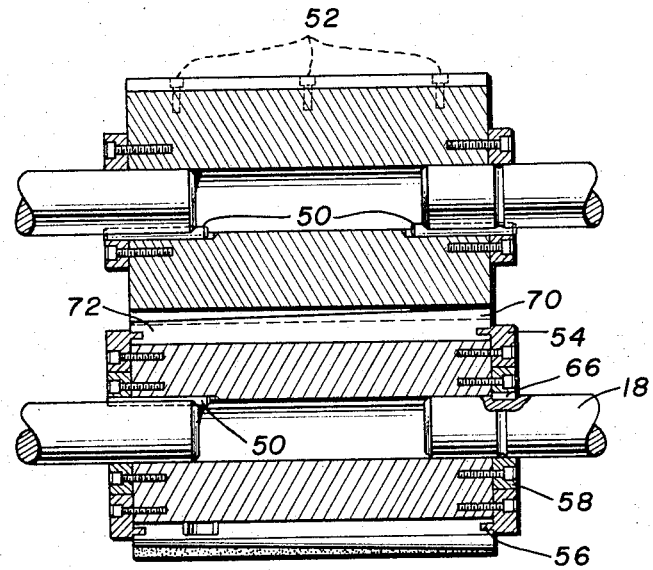
Figure 4:
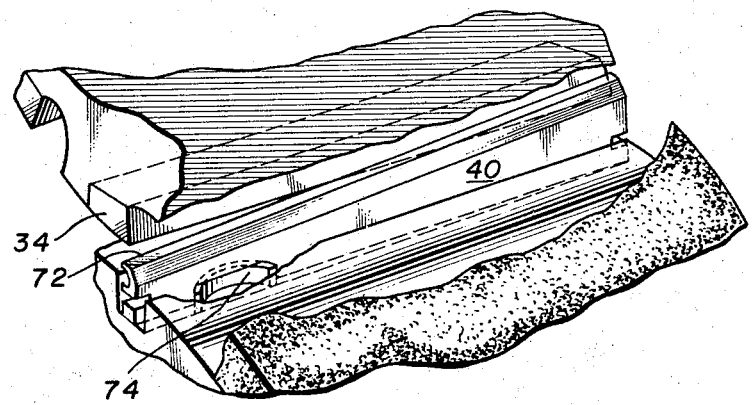

FIGURE 3 is a cross-section of the rollers showing the cutting members engaged and the retaining means for securing said members in place; and FIGURE 4 is a fragmentary view partially broken away to illustrate the inclined cutting edge of the blade and the spring means positioned in the wide end of the slot for biasing the blade against the rigidly mounted anvil to produce a scissors-type shearing action.

Figure 1:
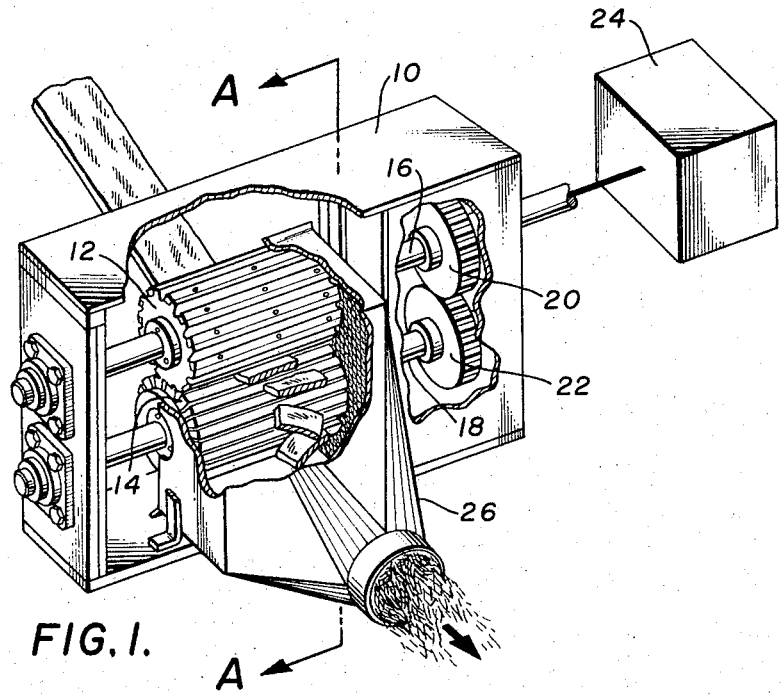
FIGURE 1 is a perspective view of the invention having parts of the frame broken away to show the cutting members and their drive gears.

Shown in FIGURE 1 is a fiber-cutting apparatus comprising a support frame 10 and having mounted therein a pair of opposed rollers 12 and 14 of equal diameter journaled on parallel shafts 16 and 18. A pair of intermeshing gears 20 and 22 are keyed to shafts 16 and 18, respectively, for driving the rollers 12 and 14 in unison. The shaft 16 is connected to a motor 24 which is provided with a standard variable speed changer, not shown, for driving the gears to rotate rollers 12 and 14 at a desired operating speed. The circumferences of the rollers are provided with selectively spaced cutting members that become engaged upon rotation of the rollers to produce a scissors-type cutting action. An exit duct 26 encloses the discharge or output side of the rollers for funneling the cut staple fibers to a collection container. The staple fibers may be transported from the rollers to the collection point by negative pressure developed with an exhaust fan, not shown, or by directing an air stream on the fibers.

Figure 2:
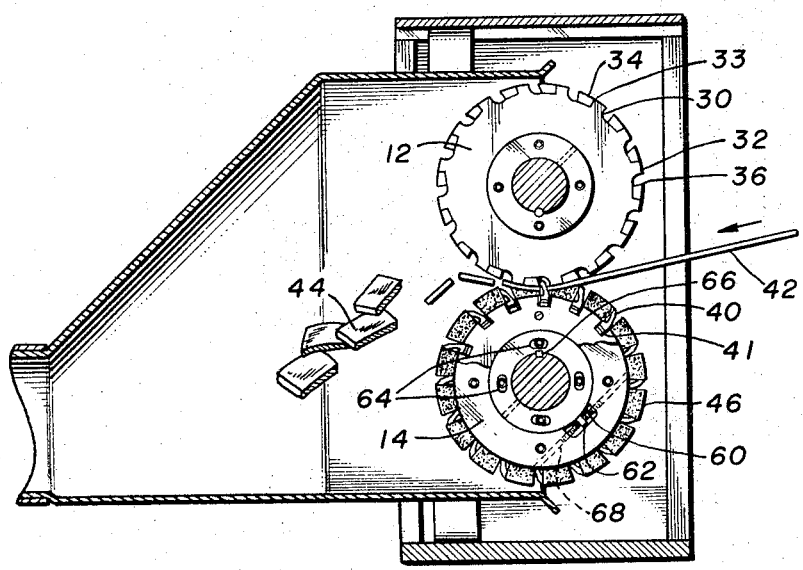
FIGURE 2 is a cross-sectional view of FIGURE 1 at A—A showing the arrangement of the cutting members.

FIGURE 2 shows the general arrangement of the rollers and the cutting member positioned thereon. The circumference of top roller 12 is characterized by a plurality of parallel grooves or recesses 30 which extend along the entire length of the roller. A raised portion 32 forms a shoulder abutment 33 between the recesses 30 and an anvil 34 having a trapezoidal cross-section about one-half the cross-sectional area of recess 30 is secured therein against shoulder abutment 33 to form an exposed sharp edge 36. The anvil surface and the surface of portion 32 are flush.

The roller 14, which is spaced vertically below and in contact with roller 12, carries a number of blades 40 which equals the number of anvils 34. The blades are disposed in slots 41 and aligned to cooperate with the anvil edge 36 upon rotation of the rollers to produce a scissors-type cutting action for reducing a continuous tow of filaments 42 into uniform staple lengths 44. Roller 14 is preferably covered by a sleeve or cot 46 comprised of a yieldable material such as rubber, foamed plastics, and the like which provides a frictional engaging surface for conveying and holding the material in place while it is being severed.

An assembly of the cutting members is further illustrated in FIGURE 3 wherein the rollers are shown keyed to their respective shafts by pins 50. The anvils 34 are secured to roller 12 by three counter-sunk screws 52 and are stationary within the recesses 30. The blades 40 are retained in their respective slots 41 by an annular flange 54 mounted on each end of roller 14 and having a rib 56 which fits into a cutout portion at both ends of the blades. A second annular flange 58 is mounted to the ends of roller 14 between flange 54 and shaft 18 to provide an adjustment means for the blades. Referring to FIGURE 2 there is shown a threaded stud 60 that may be rotated in both directions through threaded eyelet 62 to shift the position of the blades 40 relative to a cooperating anvil 34 whereby a precision adjustment can be made to properly align the cutting members. The flange 56 is provided with elongated holes 64 to facilitate the movement of roller 14 independently of the shaft which is keyed to flange 56 by a pin 66. A bore 68 provides the necessary access to the stud 60 for inserting a tool to make precise adjustments as required.

For a better understanding of the arrangement of the cutting member and the type cutting action produced thereby, reference is made to FIGURES 3 and 4. It can be seen in FIGURE 3 that blade 40 is inclined so that end 70 is substantially higher than end 72 whereupon rotation of the rollers causes engagement initially between end 70 and anvil edge 36. The lower end 72 is biased toward the opposed cutting member 34 by a crescent spring 74, as shown in FIGURE 4. Also, the higher end 70 has substantially the same thickness as the width of slot 41 to provide a fixed point where the initial engagement occurs. As illustrated in FIGURE 4, the width of slot 41 gradually increases toward end 72 so that further rotation of the rollers will overcome the strength of spring 74. Thus, the combination of the increased width of slot 41 and the declining height of blade 40 produces a skewed arrangement of the cutting members whereby a point contact between the sharp edges thereof is obtained. In other words the point of contact travels from end 70 toward the lower end 72 as the cutting members are revolved toward each other to effect a scissors-type cutting action.

In operation the bottom roller 14 is provided with a predetermined number of blades 40 depending upon the length of staple fibers desired. For example, alternately spaced blades may be removed from the roller to double the length of the staple fibers. Moreover, the blades 40 may be randomly removed to produce different lengths of staple fibers. The rollers are driven by motor 24 at a suitable speed commensurate with other operating conditions. A tow 42 is fed to the nip of rollers 12 and 14 where the tow is firmly gripped between the resilient cot 46 and the surface of roller 12 which cooperate to convey the tow and hold it in place while being severed into staple fibers 44. Upon rotation of the rollers an initial shearing engagement between the cutting members is made at end 70 and further rotation thereof overcomes the strength of spring 74 to shift the contact or cutting point transversely across the tow 42 as the strength is gradually removed. When the cutting members are fully engaged, as shown in FIGURE 3, the contact point or shearing engagement between the cutting edges thereon has traversed the entire length of the members 34 and 40 in a manner similar to the engagement of a pair of scissors.

It is to be understood that this embodiment of the invention may be altered or modified and that other embodiments may be contemplated without departing from the scope of the invention as set forth in the following claims.

I claim:
1. Apparatus for cutting a continuous tow into uniform lengths of staple fibers, comprising:
 (a) an upright support housing,
 (b) a first cylindrical member and second cylindrical member oppositely disposed for rotation on parallel shafts supported by said housing,
 (c) a plurality of grooves selectively spaced in the peripheral surface of the first cylindrical member,
 (d) an anvil having a sharp edge and stationarily secured against one wall of said grooves, said anvil being smaller in cross-sectional area than the said grooves whereby the sharp edge is exposed,
 (e) a matching number of slots in the peripheral surface of the second cylindrical member, said slots having a varying width extending from one end to the other end thereof to accommodate a laterally movable blade member,
 (f) a blade pivotally mounted in at least one of said slots and having a knifed edge exposed for contact with the sharp edge of an opposed anvil, said blade having a width substantially the same as the narrowest width of said slots to provide a pivotal point for said blade at said narrowest width when said blade makes contact with said opposed anvil,
 (g) means for driving the cylindrical members in synchronism to move the said knifed edge and said sharp edge into contact with each other to produce a cutting action, and
 (h) means carried by one of the cylindrical members for conveying and holding in place a continuous tow while said tow is being severed into discontinuous lengths.

2. Apparatus as described in claim 1 wherein the second roller is provided with a resilient sleeve which is compressed against the first roller to impose a firm grip on a tow being advanced between the said rollers.

3. Apparatus as described in claim 1 wherein one end of the blade is fixed and the other end is biased axially to produce a skew arrangement between said blade and said anvil whereupon rotation of the cylindrical members overcomes the bias imposed on the said blade.

4. Apparatus as described in claim 1 wherein the knifed edge is inclined with respect to the peripheral surfaces of said cylindrical members.

5. Apparatus as described in claim 3 wherein the knifed edge of the said blade is inclined with respect to the peripheral surfaces of said cylindrical members whereby a scissors-type cutting action is produced.

6. Apparatus as described in claim 5 wherein the blade may be adjusted with respect to a matching anvil.

References Cited

UNITED STATES PATENTS

| | | | |
|---|---|---|---|
| 968,121 | 8/1910 | Carlton | 83—582 |
| 1,398,474 | 11/1921 | Strawn | 83—348 X |
| 2,221,022 | 11/1940 | Ellis | 83—913 |
| 2,951,410 | 9/1960 | Brown | 83—345 |
| 3,110,209 | 11/1963 | Takehara | 83—345 |
| 3,233,491 | 2/1966 | Foote et al. | 83—594 |

ANDREW R. JUHASZ, *Primary Examiner.*

L. B. TAYLOR, *Assistant Examiner.*